United States Patent
Marquess

(10) Patent No.: US 10,171,608 B2
(45) Date of Patent: Jan. 1, 2019

(54) METHOD, APPARATUS AND COMPUTER PROGRAM FOR MODIFYING MESSAGES IN A COMMUNICATIONS NETWORK

(71) Applicant: Openwave Mobility Inc., Redwood City, CA (US)

(72) Inventor: Paul Marquess, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 80 days.

(21) Appl. No.: 14/520,082

(22) Filed: Oct. 21, 2014

(65) Prior Publication Data

US 2015/0113040 A1    Apr. 23, 2015

(30) Foreign Application Priority Data

Oct. 21, 2013 (GB) .................................. 1318588.9

(51) Int. Cl.
*H04L 29/08* (2006.01)
*H04L 12/58* (2006.01)
*H04L 29/06* (2006.01)

(52) U.S. Cl.
CPC ........ *H04L 67/2828* (2013.01); *H04L 51/066* (2013.01); *H04L 67/02* (2013.01); *H04L 69/04* (2013.01)

(58) Field of Classification Search
CPC .................................................. H04L 67/2828
USPC ........................................................ 709/202
See application file for complete search history.

(56) References Cited

U.S. PATENT DOCUMENTS

| 5,940,507 | A | * | 8/1999 | Cane ...................... G06F 21/602 380/277 |
| 6,230,184 | B1 | * | 5/2001 | White ...................... G06F 9/445 709/201 |
| 6,397,259 | B1 | | 5/2002 | Lincke et al. |
| 6,546,477 | B1 | * | 4/2003 | Russo ................... G06F 9/5016 711/170 |
| 6,560,618 | B1 | * | 5/2003 | Ims ........................ G06F 9/445 |
| 6,788,707 | B1 | * | 9/2004 | Horton, Jr. ........ H04L 29/06027 370/389 |

(Continued)

FOREIGN PATENT DOCUMENTS

| CN | 102231117 A | 2/2011 |
| WO | 2008107686 | 9/2008 |
| WO | 2009039637 A1 | 4/2009 |

OTHER PUBLICATIONS

Costea et al., "Coping with file formats on the Internet", 1997.*

(Continued)

*Primary Examiner* — O. C. Vostal
(74) *Attorney, Agent, or Firm* — EIP US LLP

(57) ABSTRACT

There is described a system for modifying messages having an archive format in a communications network, the communications network comprising a first network device, a second network device and a third network device. The system comprises receiving, at the first network device, a message, the message sent from the second network device for receipt by the third network device; selectively modifying, at the first network device, content of the received message that is in an archive format, based on a determination that the content can be optimized, sending the received message with the optimized content to the third network device.

10 Claims, 8 Drawing Sheets

(56) References Cited

U.S. PATENT DOCUMENTS

| | | | | |
|---|---|---|---|---|
| 6,889,256 B1* | 5/2005 | Palevich | G06F 17/30067 | 707/E17.01 |
| 6,961,766 B2* | 11/2005 | Janosik, Jr. | H04L 67/10 | 709/223 |
| 7,010,436 B2* | 3/2006 | Larsson | H01H 33/006 | 323/235 |
| 7,653,685 B2* | 1/2010 | Serenyi | H04L 29/06 | 709/203 |
| 7,907,611 B2* | 3/2011 | Stacey | H04L 69/22 | 370/389 |
| 8,234,288 B2* | 7/2012 | Ruellan | G06F 17/2241 | 707/756 |
| 8,332,751 B2 | 12/2012 | Sadovsky et al. | | |
| 8,775,480 B2* | 7/2014 | Carson | G11B 27/031 | 707/803 |
| 8,782,012 B2* | 7/2014 | Fusco | G06F 17/30324 | 707/673 |
| 8,805,715 B1* | 8/2014 | Jones | G06Q 30/02 | 705/14.66 |
| 8,972,952 B2* | 3/2015 | Pizlo | G06F 8/443 | 717/128 |
| 9,438,488 B2* | 9/2016 | Joshi | H04L 43/026 | |
| 2001/0034686 A1* | 10/2001 | Eder | G06Q 10/06 | 705/36 R |
| 2002/0147734 A1* | 10/2002 | Shoup | G06F 7/24 | |
| 2002/0156542 A1* | 10/2002 | Nandi | G05B 13/042 | 700/30 |
| 2002/0156836 A1* | 10/2002 | Janosik, Jr. | H04L 67/10 | 709/203 |
| 2002/0191691 A1* | 12/2002 | Holborow | H04L 25/4902 | 375/239 |
| 2005/0091311 A1* | 4/2005 | Lund | G08B 13/19656 | 709/203 |
| 2005/0114453 A1* | 5/2005 | Hardt | H04L 51/12 | 709/206 |
| 2005/0187962 A1* | 8/2005 | Grondin | G06F 17/30073 | |
| 2005/0188022 A1* | 8/2005 | Hanson | G06Q 30/00 | 709/206 |
| 2006/0036662 A1* | 2/2006 | Cornell | G06F 17/30893 | |
| 2006/0074935 A1* | 4/2006 | Zimmerer | G06F 17/10 | |
| 2006/0095590 A1* | 5/2006 | Miller | H04L 69/04 | 709/246 |
| 2006/0143601 A1* | 6/2006 | Concha | G06F 8/61 | 717/170 |
| 2006/0155788 A1 | 6/2006 | Peterson et al. | | |
| 2006/0264202 A1* | 11/2006 | Hagmeier | H04L 63/0823 | 455/411 |
| 2006/0271501 A1* | 11/2006 | Mazzella | G06Q 10/06 | 706/45 |
| 2006/0288208 A1* | 12/2006 | Dashora | G06F 8/67 | 713/167 |
| 2007/0044107 A1* | 2/2007 | Sengodan | G06F 9/44505 | 719/313 |
| 2007/0079379 A1* | 4/2007 | Sprosts | G06Q 10/107 | 726/24 |
| 2007/0168398 A1* | 7/2007 | Miroshnichenko | G06F 17/30067 | |
| 2007/0174639 A1* | 7/2007 | Reckless | G11B 27/11 | 713/193 |
| 2007/0255847 A1* | 11/2007 | Smith | H04L 12/00 | 709/231 |
| 2007/0294676 A1* | 12/2007 | Mellor | G06F 8/65 | 717/139 |
| 2008/0009268 A1* | 1/2008 | Ramer | G06F 17/30867 | 455/412.1 |
| 2008/0049631 A1* | 2/2008 | Morrill | H04L 41/5009 | 370/250 |
| 2008/0201552 A1* | 8/2008 | Tokie | G06F 17/30011 | 711/204 |
| 2008/0301231 A1* | 12/2008 | Mehta | G06F 8/61 | 709/204 |
| 2008/0320319 A1* | 12/2008 | Muller et al. | G06F 21/6209 | 713/193 |
| 2009/0058693 A1* | 3/2009 | Laker | H03M 7/40 | 341/65 |
| 2009/0063622 A1* | 3/2009 | Cheng | G06F 17/30899 | 709/203 |
| 2009/0106234 A1* | 4/2009 | Siedlecki | G06F 17/30864 | |
| 2009/0185040 A1* | 7/2009 | Yang | H04L 65/4092 | 348/207.11 |
| 2009/0292677 A1* | 11/2009 | Kim | G06F 17/3089 | |
| 2009/0303922 A1* | 12/2009 | Jalil | H04W 4/20 | 370/328 |
| 2010/0082979 A1* | 4/2010 | Edwards | H04L 63/0428 | 713/168 |
| 2010/0115409 A1* | 5/2010 | Robert | G06F 17/30979 | 715/716 |
| 2010/0124239 A1 | 5/2010 | Hughes | | |
| 2010/0189103 A1* | 7/2010 | Bachmann | H04W 28/06 | 370/389 |
| 2010/0223237 A1* | 9/2010 | Mishra | G06F 9/30156 | 707/693 |
| 2010/0287050 A1* | 11/2010 | Jones | G06Q 30/02 | 705/14.58 |
| 2010/0312821 A1* | 12/2010 | Bannoura | G06F 17/3089 | 709/203 |
| 2011/0022812 A1* | 1/2011 | van der Linden | G06F 9/5077 | 711/163 |
| 2011/0088021 A1* | 4/2011 | Kruglick | G06F 8/443 | 717/149 |
| 2011/0106516 A1* | 5/2011 | Friedlander | G06Q 10/04 | 703/13 |
| 2011/0138373 A1* | 6/2011 | Lane | G06F 8/443 | 717/157 |
| 2011/0167173 A1 | 7/2011 | Bansal et al. | | |
| 2011/0258163 A1* | 10/2011 | Volkoff | G06F 17/30073 | 707/661 |
| 2012/0042375 A1* | 2/2012 | Yoo | G06F 21/55 | 726/13 |
| 2012/0102135 A1* | 4/2012 | Srinivasan | G06F 9/45558 | 709/213 |
| 2012/0198017 A1* | 8/2012 | LeVasseur | H04L 51/24 | 709/206 |
| 2012/0253841 A1* | 10/2012 | Erlandsen | G06Q 50/22 | 705/3 |
| 2012/0327940 A1* | 12/2012 | Long | H04L 12/4633 | 370/392 |
| 2013/0019018 A1* | 1/2013 | Rice | H04L 12/66 | 709/226 |
| 2013/0024700 A1* | 1/2013 | Peterson | H03M 7/30 | 713/189 |
| 2013/0083053 A1* | 4/2013 | Milne | G06F 9/4443 | 345/619 |
| 2013/0095864 A1* | 4/2013 | Marovets | H04W 4/14 | 455/466 |
| 2013/0103647 A1* | 4/2013 | Ho | G06F 19/321 | 707/661 |
| 2013/0103782 A1* | 4/2013 | Afergan | G06F 17/30902 | 709/213 |
| 2013/0107895 A1* | 5/2013 | Wentink | H04L 69/04 | 370/477 |
| 2013/0132518 A1* | 5/2013 | Dashora | G06F 8/67 | 709/217 |
| 2013/0246646 A1* | 9/2013 | Iliev | H04L 69/22 | 709/232 |
| 2013/0304742 A1* | 11/2013 | Roman | G06F 17/30598 | 707/740 |
| 2014/0052983 A1* | 2/2014 | Gold | H04L 9/002 | 713/160 |
| 2014/0282371 A1* | 9/2014 | Hirsch | G06F 8/36 | 717/106 |
| 2014/0286570 A1* | 9/2014 | Leroy | H04N 19/176 | 382/166 |
| 2015/0019173 A1* | 1/2015 | Amid | G06F 17/50 | 703/1 |

(56) References Cited

U.S. PATENT DOCUMENTS

| | | | |
|---|---|---|---|
| 2015/0039597 A1* | 2/2015 | Raina | G06F 17/30867 707/723 |
| 2015/0089052 A1* | 3/2015 | Lin | H04L 69/04 709/224 |
| 2015/0109153 A1* | 4/2015 | Wu | H03M 7/30 341/65 |

OTHER PUBLICATIONS

Deutsch et al., "ZLIB Compressed Data Format Specification version 3.3", RFC 1950, 1996.*
Deutsch et al., "DEFLATE Compressed Data Format Specification version 1.3", RFC 1951, 1996.*
Deutsch et al., "GZIP file format specification version 4.3", RFC 1952, 1996.*
El-Bakry et al., "Studying the Efficiency of XML Web Services for Teal-Time Applications", 2009.*
Jopson, "UUDeview: Yet Another Format Converter", 1998.*
Komatineni et al., "Chapter 14 Exploring Security and Permissions", 2012.*
McDonough et al., "Pro SharePoint 2010 Development for Office 365", 2012.*
Pugh, "Compressing Java Class Files", 1999.*
Berners-Lee et al., "Hyptertext Transfer Protocol—HTTP/1.0", RFC1945, 1996.*
Clemm et al., "Versioning Extensions to WebDAV (Web Distributed Authoring and Versioning)", RFC3253, 2002.*
Dusseault, "HTTP Extensions for Web Distributed Authoring and Versioning (WebDAV)", RFC4918, 2007.*
Franks et al., "An Extension to HTTP : Digest Access Authentication", RFC2069, 1997.*
Goland et al., "HTTP Extensions for Distributed Authoring—WEBDAV", RFC2518, 1999.*
Klyne et al., "Registration Procedures for Message Header Fields", RFC3864, 2004.*
Kristol et al., "HTTP State Management Mechanism", RFC2965, 2000.*
Merriam-Webster, "reserve", 2017.*
Salesforce Developers, "HTTP Response size limit", 2017.*
Stackoverflow, "Maximum on http header values?", 2017.*
Belshe et al., "Hypertext Transfer Protocol Version 2 (HTTP/2)", RFC7540, 2015.*
Berners-Lee et al., "Hypertext Transfer Protocol—HTTP/1.0", RFC 1945, 1996.*
Crocker, "Standard for the Format of ARPA Internet Text Messages", RFC822, 1982.*
Fielding et al., "Hypertext Transfer Protocol (HTTP/1.1): Message Syntax and Routing", RFC7230, 2014.*
Fielding et al., "Hypertext Transfer Protocol—HTTP/1.1", RFC2616, 1999.*
Fielding et al., "Hypertext Transfer Protocol—HTTP/1.1", "6 Response", RFC2616, 1999.*
Freed et al., "Multipurpose Internet Mail Extensions (MIME) Part Five: Conformance Criteria and Examples", RFC 2049, 1996.*
Masinter, "Hypter Text Coffee Pot Control Protocol (HTCPCP/1.0)", RFC 2324, 1998.*
Nielsen et al., "An HTTP Extension Framework", RFC 2774, 2000.*
Phillips et al., "Development of a Long Term Viable Dynamic Data Archive Format", 2011.*
Buchholz, "The structure of a PKZip file", 2015.*
ECMA, "ECMA-376 Office Open XML File Formats Part 1: Fundamentals", 2006.*
ECMA, "ECMA-376-1 Information technology—Document description and processing languages—Office Open XML File Formats Part 1: Open Packaging Conventions", 2008.*
ECMA, "ECMA-376-2 Information technology—Document description and processing languages—Office Open XML File Formats Part 2: Open Packaging Conventions", second edition, 2008.*
Pkware, ".ZIP File Format Specification", 2014.*
Developer World—Sony, Tips for Reducing APK File Size; Accessed on Oct. 17, 2014; http://developer.sonymobile.com/2012/01/31/tips-for-reducing-apk-file-size/.
DuxSolutions, Office Open XML Cruncher—Single User License exc. VAT; Accessed on Oct. 17, 2014; http://duxsolutions.com/shop/index.php?main_page=product_info&cPath=2&products_id=12.
NXPowerLite, Compression Software for Use at a Server; Accessed on Oct. 17, 2014; http://www.neuxpower.com/products/nxpowerlite-file-server/.
ProGuard, Optimisation Software for java, apk, etc.; Accessed on Oct. 17, 2014; http://proguard.sourceforge.net/index.html#manual/introduction.html.
ZAMZAR, Online Tool for File Conversion; Accessed on Oct. 17, 2014; http://www.zamzar.com/fileformats/zip.
Combined Search & Examination Report dated Apr. 24, 2014 issued in GB application No. 1318588.9 filed Oct. 23, 2013.

* cited by examiner

METHOD, APPARATUS AND COMPUTER PROGRAM FOR MODIFYING MESSAGES IN A COMMUNICATIONS NETWORK

CROSS-REFERENCE TO RELATED APPLICATIONS

This application claims the benefit under 35 U.S.C. § 119(a) and 37 CFR § 1.55 to GB patent application no. 1318588.9, filed on Oct. 21, 2013, the entire content of which is incorporated herein by reference.

BACKGROUND OF THE INVENTION

Field of the Invention

The present invention relates to a method, apparatus and computer program for modifying messages in a communications network. In particular, the present invention relates to modifying messages having an archive file format.

Description of the Related Technology

It is typical to apply various compression techniques to computer files in order reduce the memory space taken up by those computer files, for example in computer memory. The compression can also mean that, when such compressed files are transported over a communications network such as the Internet, a reduced bandwidth is required compared with the bandwidth that would otherwise have been required if no compression were to be applied to those files. The reduced bandwidth, in turn, allows download or upload file transfer times to be cut down.

The reduced bandwidth, transfer times and storage space can be effected by packaging the computer files or content in a specific format, for example, using an archive file format, which provides a format in which one or more of the contained files can be compressed.

SUMMARY

Embodiments of the present invention generally provide a technique for modifying archive files so that the files are optimized for transportation and/or storage.

In a first exemplary embodiment of the invention, there is an apparatus for modifying messages having an archive format in a network comprising the apparatus, a second network device and a third network device, the apparatus may comprise a processing system arranged to: receive a message sent from the second network device for receipt by the third network device; selectively modify content of the received message that is in an archive format, based on a determination that the content can be optimized; and send the received message with the optimized content to the third network device.

In a second exemplary embodiment of the application, there is a method for modifying messages having an archive format in a communications network, the communications network may comprise a first network device, a second network device and a third network device, the method may comprise receiving, at the first network device, a message, the message sent from the second network device for receipt by the third network device; selectively modifying, at the first network device, content of the received message that is in an archive format, based on a determination that the content can be optimized, sending the received message with the optimized content to the third network device.

In a third exemplary embodiment of the invention, there is a computer program comprising a set of instructions which when executed by a processing system causes the system to carry out a method for modifying messages having an archive format in a communications network, the communications network may comprise a first network device, a second network device and a third network device, the method may comprise receiving, at the first network device, a message, the message sent from the second network device for receipt by the third network device; selectively modifying, at the first network device, content of the received message that is in an archive format, based on a determination that the content can be optimized, sending the received message with the optimized content to the third network device.

Further features and advantages of the application will become apparent from the following description of preferred embodiments of the invention, given by way of example only, which is made with reference to the accompanying drawings.

BRIEF DESCRIPTION OF THE DRAWINGS

FIG. 8b is a schematic block diagram showing an example archive file of the HTTP response message of FIG. 8a.

DETAILED DESCRIPTION OF CERTAIN INVENTIVE EMBODIMENTS

Figure 1:
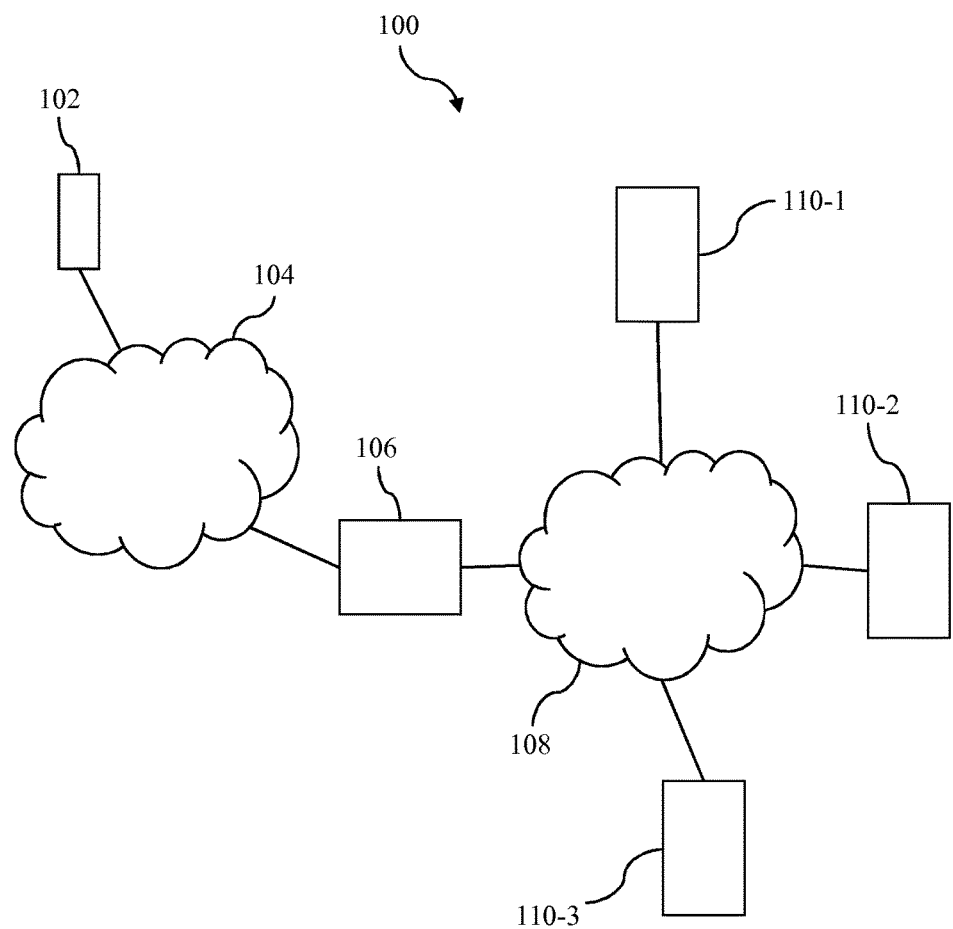
FIG. 1 is a schematic block diagram showing an example of a communications network.

In the following description of exemplary embodiments it should be noted that the term "user equipment" (UE) includes apparatus that are both wireless devices and wired devices. In general, wireless devices include any device capable of connecting wirelessly to a network. This includes in particular mobile devices including mobile or cell phones (including so-called "smart phones"), personal digital assistants, pagers, tablet and laptop computers, content-consumption or generation devices (for music and/or video for example), data cards, USB dongles, etc., as well as fixed or more static devices, such as personal computers, game consoles and other generally static entertainment devices, various other domestic and non-domestic machines and devices, etc. The UE includes a "user agent" that comprises a software application that acts on behalf of a user. For example, the user agent may be used to communicate with a network such as the Internet. Examples of 'user agents' include email readers or clients, Internet browsers (e.g. Internet Explorer®, Mozilla Firefox®, Google Chrome®, and so forth) that act as a user interface to communicate with the Internet, and various software applications (sometimes referred to as "apps", such as those that are designed to run on smartphones and other devices). The user agent may use any suitable protocol as its transport or communications mechanism. For example, the user agent may use the Hypertext Transfer Protocol (HTTP).

Embodiments of the present invention provide techniques for identifying that an archive file is not in its optimum compressed form and modifying it so as to provide improved compression for that archive file whilst maintaining the fidelity of the data comprised within the archive file that is to be processed (e.g. extraction of content from within the archive file) by a user equipment (i.e. so that the data is not corrupted or degraded in any way). According to a first example, this may be done by identifying and removing a redundant field in a ZIP container (i.e. a type of archive file) so as to reduce the size of that ZIP container, thereby reducing storage space consumed by that ZIP container in a device, reducing bandwidth consumed by transfer of the ZIP container in a network and reducing the file transfer time of that ZIP container in the network. Other methods of optimizing the archive file, aside from identifying and removing a redundant field from the archive file, will be apparent as detailed later in the description.

The terms "archive", "archive file", "package" and "container" as used herein generally refer to a file format that enables one or more computer files, parts or "entries" to be contained together along with the associated metadata. Archive files may be for use by a user agent and may contain executable files. The archive files can therefore contain multiple entries together for storage and transport, whilst consuming less storage space and/or bandwidth than otherwise would have been apparent if such files were not provided in the archive file format. Typically, an archive file may comprise a central directory or directory structure that provides information relating to the entries contained within. In particular, the central directory provides a list of names of the entries stored in the archive file, metadata about each entry, and offsets that point to the location of each entry in the archive file. The archive file may also comprise error detection and correction information (i.e. to allow detection and correction of corrupted files), arbitrary comments (i.e. information about the archive file) and encryption (such that only authorized persons may access the file). Each entry of the archive file begins with a header block (a "local file header") followed by payload data. The payload data of each entry within the archive file may be compressed using various compression techniques so as to ensure that the archive file consumes minimal space.

Exemplary embodiments may refer to the archive file in general as a "ZIP" container or file, which will be understood to encompass the different types of archive file unless the context in which this term is used states otherwise. More particularly, a ZIP file is formatted according the zip file format specification provided by PKWare, Inc (see APPNOTE.TXT-zip File Format Specification© 1989-2012 PKWARE Inc., which is hereby incorporated by reference).

In some exemplary embodiments described herein, specific types of archive files or ZIP files will be referred to such as those used by Microsoft Office application software (e.g. versions 2007 and upwards). These ZIP files are in the "Office Open XML" format, which is based on XML (Extensible Markup Language) and is also known as OOXML or OpenXML. Office Open XML was developed so as to represent spreadsheets, charts, presentations, word processing documents and other such electronic files. For example, Microsoft Office files such as those provided by Microsoft Word, Excel and PowerPoint, amongst others, may be provided using Office Open XML. The Office Open XML file format has been standardized as "ECMA-376" by Ecma (European Computer Manufacturers Association) International, by the International Organization for Standardization (ISO) and by the International Electrotechnical Commission (IEC), hereby incorporated by reference. A document in compliance with the OpenXML format is thus a ZIP package, which contains one or more files, such as headers, comments and a payload (e.g. for the document body). The XML files that make up an Office Open XML ZIP package are often referred to as XML parts or document parts, where a part is a stream of bytes (a stream is a linearly ordered sequence of bytes). Parts are analogous to a file in a file system or to a resource on an HTTP server. A more detailed description of the structures of the HTTP message, ZIP container and entries are given with reference to FIGS. 8a, 8b and 8c.

Filename extensions and content type identifiers may be used to distinguish the different types of archive file or ZIP container formats. For example, filename extensions may be used to denote a particular archive format, such as zip, rar, 7z, tar, jar, war, apk, xpi, epub, docx, dotx, docm and so forth (usually denominated by a preceding full stop, e.g. ".zip"). This list is non-exhaustive and it will be understood that there are many other archive formats to which embodiments of the present invention will apply. Additionally, content type identifiers may be used, such as the Multipurpose Internet Mail Extensions (MIME) Internet standard identifiers. This is exemplified in Table 1 below, which shows various Microsoft Office document types (in the Office Open XML format) along with their associated filename extension. These MIME types are known ZIP containers.

TABLE 1

Examples of MIME types of known ZIP containers with their associated filename extensions

| Microsoft Office program | Extension | MIME type |
|---|---|---|
| Microsoft Word | .docx | application/vnd.openxmlformats-officedocument.wordprocessingml.document |
| | .dotx | application/vnd.openxmlformats-officedocument.wordprocessingml.template |
| | .docm | application/vnd.ms-word.document.macroEnabled.12 |
| | .dotm | application/vnd.ms-word.template.macroEnabled.12 |
| Microsoft Excel | .xlsx | application/vnd.openxmlformats-officedocument.spreadsheetml.sheet |
| | .xltx | application/vnd.openxmlformats-officedocument.spreadsheetml.template |
| | .xlsm | application/vnd.ms-excel.sheet.macroEnabled.12 |
| | .xltm | application/vnd.ms-excel.template.macroEnabled.12 |
| | .xlam | application/vnd.ms-excel.addin.macroEnabled.12 |
| | .xlsb | application/vnd.ms-excel.sheet.binary.macroEnabled.12 |
| Microsoft PowerPoint | .pptx | application/vnd.openxmlformats-officedocument.presentationml.presentation |
| | .potx | application/vnd.openxmlformats-officedocument.presentationml.template |
| | .ppsx | application/vnd.openxmlformats-officedocument.presentationml.slideshow |
| | .ppam | application/vnd.ms-powerpoint.addin.macroEnabled.12 |
| | .pptm | application/vnd.ms-powerpoint.presentation.macroEnabled.12 |
| | .potm | application/vnd.ms-powerpoint.presentation.macroEnabled.12 |
| | .ppsm | application/vnd.ms-powerpoint.slideshow.macroEnabled.12 |

Accordingly, a ZIP container can be identified by determining the content type of a message as being one of many recognizable MIME types (for example, those listed in Table 1).

The term "optimizing" or "optimization" with reference to ZIP containers generally refers to the process of modification of a ZIP container to its most efficient form for storage and transport. This term therefore can broadly encompass techniques such as transcoding, transrating, encoding, compression and decompression/uncompression depending on the context in which the term is used. In the examples discussed herein, optimizing a ZIP container is done so as to realize the best possible compression (i.e. the smallest size that the ZIP container can take) whilst maintaining the fidelity of the payload of the ZIP container. In particular, the fidelity of the payload is maintained if there is no degradation or corruption of payload data that is contained within the ZIP container. In this regard, although some examples described herein discuss the stripping of fields from a ZIP container, as these fields are "empty" (i.e. containing no usable data or null-value bytes), the fidelity of the data of the ZIP container is maintained (the data is not degraded or corrupted by removal of empty fields having NULL value bytes). The optimization may also depend on characteristics of a user agent (i.e. a software application) of a user device for which the ZIP container is intended or characteristics of the user device. For example, if it is determined that a ZIP container can be optimized but that such an optimized ZIP container would not be processed correctly by the user agent, then it will be determined that no optimization or a different optimization should take place.

FIG. 1 shows schematically a simplified example of a communications network 100, in which exemplary embodiments of the present invention may be implemented. The communications network may typically comprise, for example, an Internet Protocol Multimedia System (IMS) architecture. The network may comprise a plurality of network elements 102, 104, 106, 108, 110. In particular, there are a plurality of UEs 102 (only one shown and described for simplicity of explanation), which are in communications via a first network 104 with an intermediate network element (INE) 106. The INE 106 in turn is in communication via a second network 108 with a plurality of servers 110. The first network 104 may be an access network that can allow the UEs 102 to access the Internet, for example a 3G or LTE mobile network, or a PSTN or Cable network connecting the UE to an internet service provider (ISP). The connection between the UEs 102 and the INE 106 may include both wired and wireless elements, including 3G/LTE elements and/or 802.11 (WiFi). The second network 108 may represent a wide area network, such as the Internet, through which messages may be sent to one or more servers 110. The servers 110 are capable of receiving the messages from the UEs and can send responses to these messages.

The INE 106 is used to intercept messages in the communications network 100 sent between the UE 102 and the servers 110. As such, the INE 106 can be used to selectively control and modify such messaging. For example, the servers 110 may host content such as web pages and media files and the UE 102 may signal one or more of the servers 110 so as to retrieve such content. The INE 106 may intercept, modify and control the content before it is passed onto the UE 102. Therefore, the UE 102 is in communication with the INE 106, which in turn is in communication with each of the plurality of servers 110. The INE 106 is capable of communicating with the plurality of servers 110 via the Internet 108. Although in this figure, the INE 106 is shown to be placed between the access network 104 and the internet 108, it will be understood that this is for ease of illustration only and that the INE 106 can be placed at any point in the communications network so that it is capable of intercepting communications between the UE 102 and the servers 106. For example, the INE 106 may form part of the access network 104 itself or may form part of the Internet 108.

Figure 2:
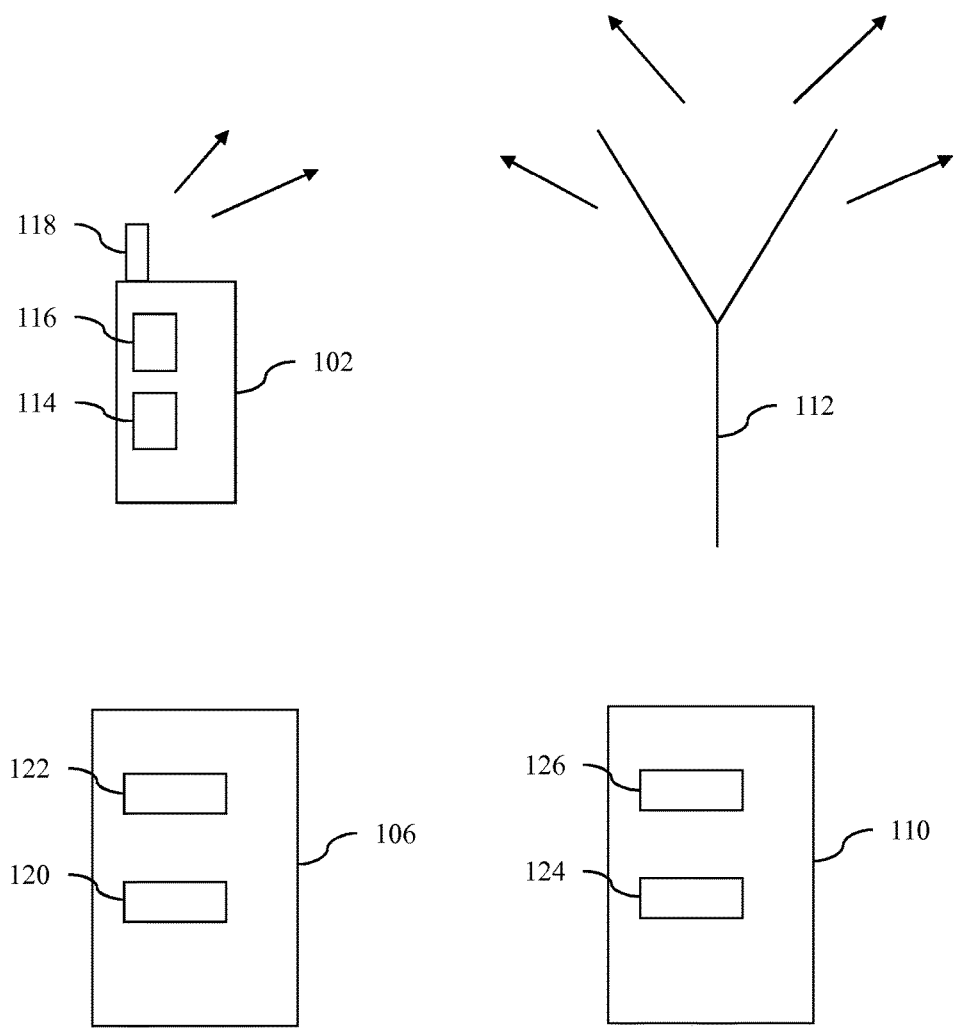
FIG. 2 is a schematic block diagram showing network elements present in the communications network of FIG. 1 in further detail.

FIG. 2 shows schematically a UE 102 such as a mobile phone, an INE 106, a server 110 and a network control apparatus 112 for use in the communications network 100 of FIG. 1. The UE 102 contains the necessary radio module 114, processor(s) and memory/memories 116, antenna 118, etc. to enable wireless communication with the network 100. The UE 102 in use is in communication with a radio mast associated with the network control apparatus 112. As a particular example in the context of UMTS (Universal Mobile Telecommunications System), there may be a network control apparatus 112 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The network control apparatus 112 (of whatever type) may have its own radio module, processor(s) and memory/memories, etc. Similarly, the INE 106 may have its own radio module 120, processor(s) and memory/memories 122, etc. Similarly, each of the plurality of servers 110 may have their own radio module 124, processor(s) and memory/memories 126, etc. The INE 106 is a device, network node or module that can be co-located or integrated with existing network architecture. As such, in some examples, the INE 106 may form part of a cellular network. In one example, it may be a stand-alone device, such as a proxy server. The INE 106 is said to be "intermediate" because it is placed in the communications network 100 between the UE 102 and other network elements such as the origin server 110-1, and one or more other servers 110-2, 110-3 which may be associated with third party content providers (i.e. third party in the respect that they are different from an operator associated with the INE 106) or web site hosting servers. The INE 106 is used to intercept signaling or messages from the UE 102 and may be used to determine whether or not any control, modification or optimization of content is desirable before being provided to the UE 102. For example, the INE 106 can be used to add data to the messages, determine access rights for the UE 102 to allow access to the content of the messages, or optimize, transcode, encode, transrate or compress the messages. For example, the content may in the form of electronic documents, Hypertext Markup Language (HTML) or media such as audio, video, text and/or images. More particularly, the electronic documents may comprise an archive file format, such as the ZIP format. The INE 106 may comprise a processing system and memory containing computer readable instructions which are executed by the processing system for the INE 106, or any of its components or modules, to perform their functions. The INE 106 also may comprise suitable communications interfaces for communicating with other entities in the network.

Figure 3:
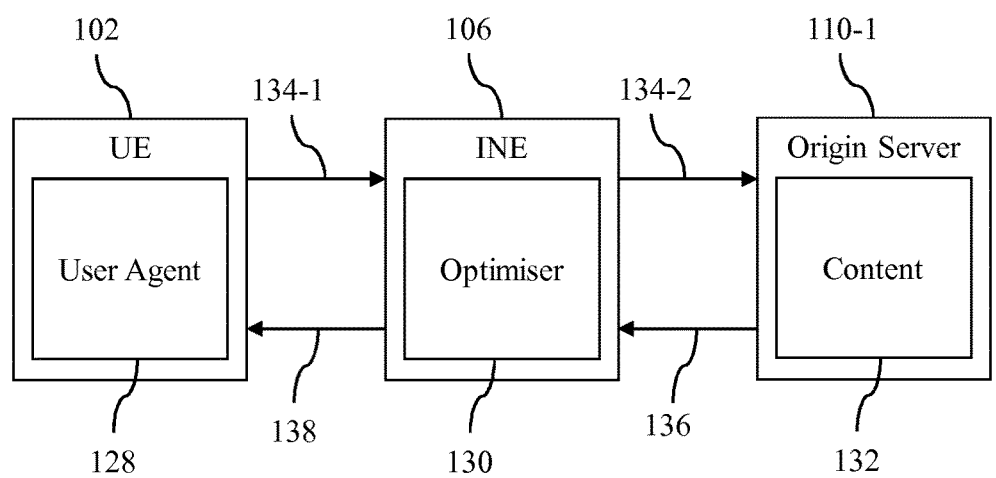
FIG. 3 is a schematic block diagram showing an example of signaling in the communications network of FIG. 1.

FIG. 3 shows a schematic block diagram of an example of the system architecture of FIG. 1 in further detail. There is provided a UE 102 having a user agent 128, which in this example may be a web browser, an INE 106 having an optimizer module 130 and an origin server 110-1, which stores content 132. The INE 106 is located in a communication path between the UE 102 and the origin server 110-1, as discussed above with reference to FIG. 1. In this example, the INE 104 is arranged to intercept all communications between the UE 102 and the origin server 110-1. Although this figure shows signaling that takes place in both directions between the UE 102 and the server 110, it will be appreciated that some exemplary embodiments are concerned with signaling that takes place in a single direction (e.g. messages that are sent from the origin server 110-1 to the UE 102).

The optimizer module 130 of the INE 106 is used to selectively modify messages from the origin server 110-1 for sending to the UE 102. The origin server 110-1 generally contains data and content populated by an operator of the origin server 110-1 or some other entity and as such may contain a database (not shown) to store such content. For example, the origin server 110-1 may store Microsoft Office documents, such as Microsoft Word documents, Microsoft PowerPoint presentations and Microsoft Excel spreadsheets.

In the operation of one example, when a user of the UE 102 wishes to retrieve content, the user may cause the browser 128 to compile and send a request message, such as a Hypertext Transfer Protocol (HTTP) request 134-1, towards a server that hosts the requested content, which in this case is the origin server 110-1. The request 134-1 may be triggered in response to various events, such as in response to the user selecting a hyperlink in a currently viewed webpage, which triggers the user agent 128 to sends the request 134-1 so as to fetch the requested ZIP container (e.g. a Microsoft Word document). Alternatively, the request message 134-1 may be a request to retrieve a user's email from an email server 110-1. In some examples such as when a "push" email system is used, an email can be sent to the UE 102 from the email server 110-1 without requiring any sending of request messages 134-1.

The INE 106 intercepts or receives the request 134-1 and analyzes it to determine the destination of the request 134-1, which in this case is the origin server 110-1. The request 134-1, in this example, is accordingly forwarded to the origin server 110-1 in its original format as a HTTP request 134-2. Based on the received HTTP request 134-2, the origin server 110-1 sends a HTTP response 136 destined for the UE 102. The response 136 contains at least a portion of the requested content, which content is comprised in an archive file format.

After having intercepted the HTTP response 136, the INE 106 uses optimizer module 130 to decide whether or not any modification of content contained within the response 136 is desirable. The optimizer module 130 may determine that the response 136 is a candidate for modification based on one or more factors (or combination of factors). Non-limiting examples of such factors include: (1) determining that the format of the content 132 of the response 136 is in an archive file format; (2) where the content 132 is determined to be in an archive file format, determining that the archive file format is not in its best optimized or compressed form; and (3) where the content 132 is determined to have an archive file format and where it has been determined that optimization is desirable, determining that the user agent 128 supports such an optimized archive file format.

After having modified the response message 136, the modified response 138 is then sent on to the UE 102 by the INE 106 for processing by the user agent 128.

Figure 4:
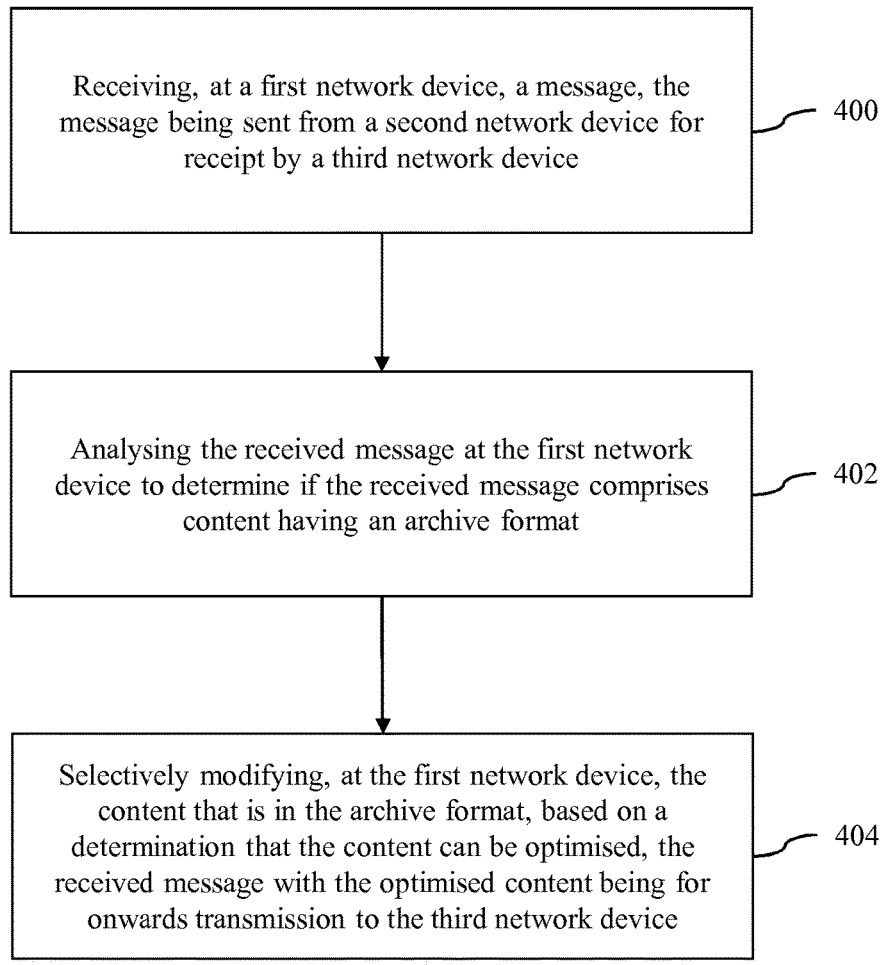
FIG. 4 is a schematic state flow diagram showing processes that occur in a first example of a method.

FIG. 4 shows a schematic state flow diagram of processes that occur in a first example of a method. The method is used for selectively modifying a received message, where the received message may comprise an archive format. The method, for example, may be used by a network device such as the INE 106 for modifying content in a communications network 100, such as the network shown in FIG. 1. In this first example, the communications network may comprise a first network device, which may be the INE 106, a second network device, which may be the origin server 110-1, and a third network device, which may be the UE 102. The message may for example be a HTTP message that may comprise an Office Open XML document that can be modified for optimization, for example, by removing redundant fields in the Office Open XML document.

At step 400, a message sent by the second network device is received at the first network device. This message is destined for receipt by the third network device but is intercepted beforehand by the first network device. As with the communications network of FIG. 1, the first network device as the INE 106 may form part of an access network 104 such that all messages that are directed to the UEs 102 (i.e. the third network device) can be intercepted by the INE 106. The received message may be one that was initiated by the second network device based on and/or in response to receiving a request message or may be a message that was initiated by the second network device without having first received any such request message.

At step 402, the first network device analyzes the received message to determine if the received message may comprise content having an archive format. For example, and as detailed below with reference to FIG. 5, a content type of the response message (more specifically, a content type of a payload or body contained within the response message) may be determined, and based on this determination, the first network device may recognize the content type as being one which is known to have an archive format. Other techniques may be used in addition to or as an alternative to identifying the content type of the response message, such as by identifying a signature of bytes of the content that the first network device can recognize as being indicative of an archive format.

At step 404, the first network device selectively modifies the content that is in the archive format, based on a determination that the content can be optimized. The received message with the modified content is then passed on to the third network device. For example, the first network device may determine that the archive file can be modified to take up less storage space and/or bandwidth when being transmitted in the network. Accordingly, if it is determined that the archive file can be modified in such a manner to take up less space and/or bandwidth, the first network device will perform the modification. In particular, and as discussed below with reference to FIG. 5, the modification or optimization may be performed if it is determined that the archive file can be compressed without affecting the fidelity of the content within the archive file (i.e. so that no content is lost or deleteriously affected). The optimization may be carried out, for example, by stripping fields from the archive file that have been identified as redundant, by re-compressing payload data using a compression algorithm that is superior to the determined current compression (if any), by removing a compression if it is determined that such removal would decrease the size of the archive file (i.e. if the existing compression has "bloated" the file), and/or by changing the container type of the archive file.

Figure 5:
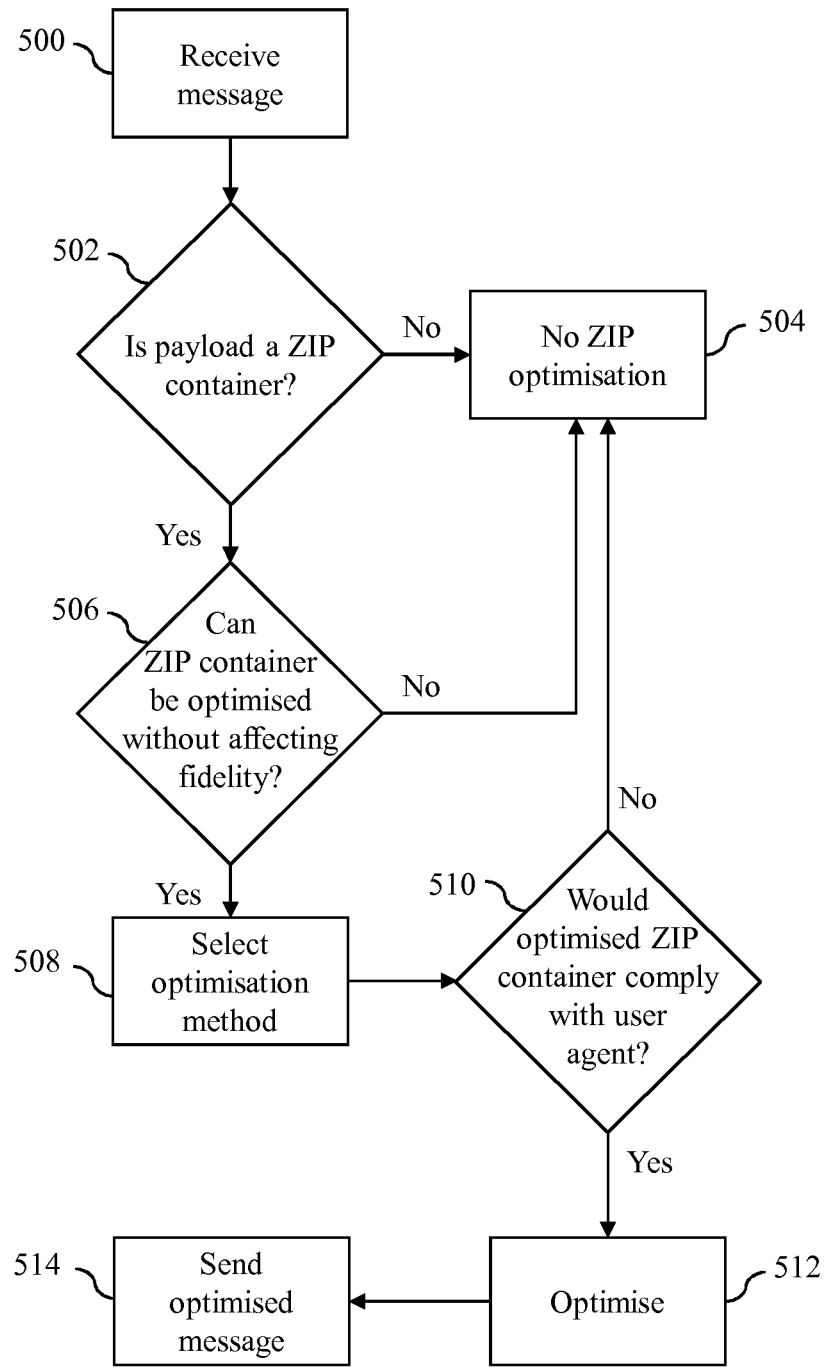
FIG. 5 is a schematic state flow diagram showing a process for modifying a HTTP response in a second example of a method.

FIG. 5 is a schematic state flow diagram showing a process for modifying a received message in a second example of a method. In this example, the received message is a HTTP message that has been sent by an origin server 110-1 for receipt by a UE 102, but that has been intercepted by an INE 106. The HTTP message may be a HTTP response message 136 that is based on a HTTP request message 134-2 that has been sent by the UE 102, intercepted by the INE 106, and forwarded onto the origin server 110-1 by the INE 106.

At step 500, the INE 106 receives the HTTP response message 136. An optimizer module 130 of the INE 106 then analyzes the received HTTP response message 136 to determine certain characteristics of the response message 136.

In particular, at step 502, the optimizer module 130 determines if the payload or body of the HTTP response message 136 may comprise a ZIP container. This is done by analyzing the headers of the HTTP response message 136, and in particular a "content-type" header to determine if the content type of the payload corresponds with or is otherwise associated with ZIP container. There are numerous content types that can be identified by reading the content-type header of the HTTP response message 136, for example, the content type may relate to one of many Multipurpose Internet Mail Extensions (MIME) being recognizable as ZIP containers, as exemplified in Table 1 above.

For example, Microsoft Word documents (version 2007 and above) may take a "application/vnd.openxmlformats-officedocument.wordprocessingml.document" MIME type. Accordingly, a content-type header of a HTTP response message 136 that identifies a MIME type as "application/vnd.openxmlformats-officedocument.wordprocessingml.document" will be recognized as being characteristic of a ZIP container. This recognition is made possible due to the MIME types having been previously registered with the appropriate authorities or operating system providers (for the purpose of allowing an operating system to recognize the content type in order to process the relevant file of that content type), such as the "Internet Assigned Numbers Authority" (IANA).

In addition to or as an alternative to the ZIP container determination by analyzing the content-type header, the optimizer module 130 may either parse the initial bytes in the payload of the ZIP container so as to identify a signature that is characteristic of a ZIP container. More particularly, and in accordance with APPNOTE.TXT, a ZIP container will always begin with a series of bytes, which, in a hexadecimal format, takes a value of "0x04034b50". Other signatures that can be used to identify a payload as being a ZIP container will be apparent to a person skilled in the art. Accordingly, if a signature string of bytes is identified whilst parsing the ZIP container, the optimizer module 130 will flag that the payload may be a ZIP container. The absence of this signature will flag that the payload may not be a ZIP container and therefore identifying the presence of lack of this signature may be used as a confirmation step to follow the content-type header determination (if this step is done in addition to the content-type header determination and not as an alternative).

If at step 502, the payload of the HTTP response message 136 is determined to be other than a ZIP container, or is otherwise determined not to be a ZIP container, the process moves on to step 504 where a decision is made not to optimize the ZIP container in the manner herein described. The INE 106 may then resume its usual functionality without modifying the ZIP container in the manner described by embodiments of the present invention.

If at step 502, the payload of the HTTP response message 136 is determined to be a ZIP container, then the process moves on to step 506 where the optimizer module 130 performs a further analysis to determine whether or not the ZIP container can be optimized without affecting the fidelity of the data of the payload. That is to say, whether the ZIP container can be optimized without corrupting or degrading the data (e.g. which data is for output to a user of the UE 102). This is done by analyzing various characteristics of the HTTP response message 136 and/or the ZIP container to determine if any type of optimization would be appropriate. For example, different types of optimization may be possible depending on various characteristics of the ZIP container (which may be identified either by the HTTP response message and/or the ZIP container), as described in more detail with reference to FIGS. 6, 7 and 8.

For example, the optimizer module 130 may act to identify fields in the entries of the ZIP container that are redundant and can modify those entries by removing the redundant fields, as described in more detail with reference to FIG. 6.

In another example, the optimizer module 130 can identify if a compression has been applied to the entries within the ZIP container to make decisions whether or not to apply a compression, remove an existing compression or re-compress the entries of the ZIP container using a different compression algorithm (as described in more detail with reference to FIG. 7).

In a further example, the optimizer module 130 can determine if a different ZIP container type would provide a higher amount of compression and can accordingly apply a conversion to change the ZIP container type, as described in more detail with reference to FIG. 8.

If at step 506, it is determined that the ZIP container cannot be optimized whilst maintaining the fidelity of the information contained therein, then the process moves on to step 504 where it is determined that no modification should be made to the ZIP container.

However, if at step 506, it is determined that the ZIP container can be optimized whilst maintaining the fidelity of the content within the ZIP container, then an optimization method is selected at step 508 for use in modifying the ZIP container. As mentioned above, different optimization methods may be appropriate depending on certain characteristics of the ZIP container. It is noted that, in some exemplary embodiments, there may be only one optimization method and therefore step 508 is not required.

Step 506 may also be optional such that the optimization may always be performed regardless of the fidelity of the information. For example, in some examples, it may be assumed that a particular type of optimization (e.g. removal of particular identified fields in the ZIP container) will not affect the fidelity of the content within the ZIP container. Accordingly, such determination of whether the ZIP container can be optimized without affecting the fidelity of the information is not required. In such a case, if at step 502, a payload is determined to be a ZIP container, then the process may skip to step 512 whereby the ZIP container is then optimized (i.e. without steps 506, 508 and 510 having taken place).

In other exemplary embodiments, a combination of methods may be used to maximize the optimization that can be applied to the ZIP container.

After having selected a method of optimization at step 508, the process then moves on to step 510. As noted above, this step is optional and is not necessary in some exemplary embodiments. For example, as this step 510 requires knowledge of the user agent, this step may be applicable only for cases where an HTTP response message 136 has been sent by the origin server 110-1 based on a received HTTP request message 134-2 (which identifies the user agent using a user-agent header). Therefore, this step would not be possible in cases where no user agent has been determined by the INE 106.

At step 510, the optimizer module 130 makes a determination of whether the ZIP container, if modified using the selected optimization method (or only optimization method in the case where there is only one method), is compliant with the user agent that requested the ZIP container. This is done by comparing characteristics of the optimization process with user agent capabilities. The INE 106 is aware of the user agent due to the previously intercepted HTTP request message 134-1 upon which the HTTP response message 136 is based. More particularly, when the INE 106 receives the HTTP request message 134-1, it can determine the user agent from a user agent header field. This information can then be used in subsequent processing, such as by the optimizer module 130 of the INE 106, which can identify the user agent for which the ZIP container of the HTTP response message 136 is intended and thereby perform an analysis to determine if the user agent would be able to properly process the ZIP container once modified with the selected optimization method. If it is determined that the user agent would not be able to properly or correctly process the modified ZIP container then the process moves on to step 504 where it is decided that the ZIP container should not be modified. Alternatively, the optimizer module 130 may decide to optimize the ZIP container so that it can be properly processed by the determined user agent. Furthermore, although not shown in FIG. 5, a look-up may be performed in a database (either stored locally at the INE 106 or remotely from the INE 106) to determine device characteristics based on the identified user agent, such as screen size, processing capabilities or the type of device (i.e. make and model). The device characteristics may also be inferred based on the traffic (i.e. request messages) from the UE that has been intercepted by the INE 106, as discussed in further detail below with reference to the description of co-pending UK patent application GB1219523.6. Accordingly, by determining the identity of the agent sending the message, it is possible to determine these other properties by looking up information in a memory. Here the type of agent may refer to a type of device, a type of application running on a device, or a combination of the two. In some examples, such property information or characteristics can be used to determine how an archive container may be optimized.

For example, the INE 106 will be aware of which fields of the ZIP container are required by the user agent in order to properly process the ZIP container (such as by extracting the contents from within the ZIP container). This is based on the INE 106 having previously identified the user agent and having identified the user agent's capabilities (by, for example, performing a look up of the user agent's capabilities in a local database or a database elsewhere in the network. If the selected optimization method indicates that a field in the ZIP container is redundant and should be removed but the information relating to the user agent indicates that such removal of that field would mean that the user agent would not be able to properly process the ZIP container without that field or that the execution of the content within the ZIP container would result in a degraded output (e.g. poor quality or corrupted files displayed to a user), then the process moves to step 504 where it is decided that no ZIP optimization shall take place. Otherwise, the process moves on to step 512, whereby the ZIP container is optimized.

At step 512, the ZIP container is optimized using a selected optimization method that has been determined as being suitable for optimizing the ZIP container whilst ensuring that the optimized ZIP container can still be properly processed by the user agent of the UE 102. Examples of different optimization processes are described below with reference to FIGS. 6, 7 and 8.

At step 514, the modified ZIP container is included in a modified HTTP response message 138, which is then sent to the UE 102 for processing by the user agent 128.

Figure 6:
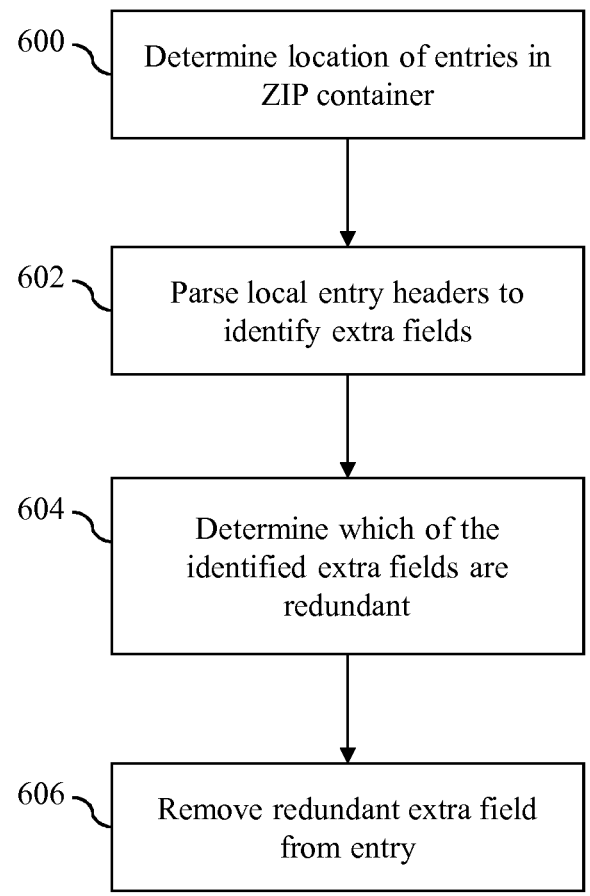
FIG. 6 is a schematic state flow diagram showing processes that occur in a first example of an optimization process.
Figure 7:
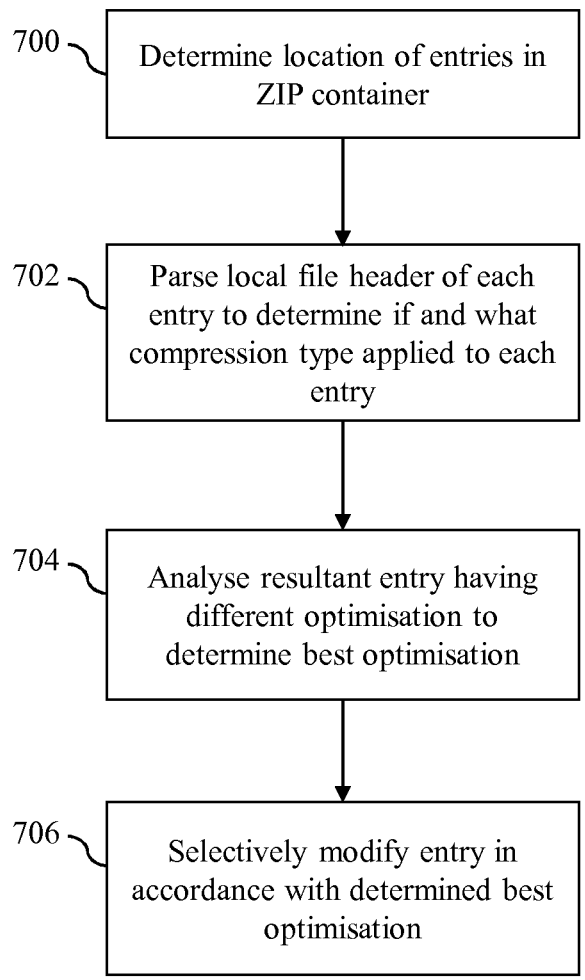
FIG. 7 is a schematic state flow diagram showing processes that occur in a second example of an optimization process.

FIGS. 6 and 7 show different example optimization processes that may occur in steps 506 to 512 of FIG. 5.

FIG. 6 is a schematic state flow diagram showing processes that occur in a first example of an optimization method for use in optimizing a ZIP container (which optimization takes place in step 512 of FIG. 5). This optimization method may be selected from a plurality of optimization methods or, alternatively, this optimization method may always be made when making a decision to optimize the ZIP container. In this example, redundant fields within the ZIP container are identified and removed so as to improve the compression of the ZIP container.

At step 600, after having identified the received message as comprising a ZIP container (e.g. by identifying a content type of the payload of the container), the optimizer module 130 will then "walk" or parse the ZIP container before then reading a central directory of the ZIP container so as to locate each entry within the ZIP container. The structure of the ZIP container having a central directory and one or more entries is described in further detail below with reference to FIGS. 9a to 9c.

At step 602, after having identified the locations of the entries in the ZIP container, the optimizer module then parses the local file headers of each entry so as to identify particular fields known as "extra fields", which are used as optional fields in the ZIP container (see Table 2 below for local file header structure). More particularly, the extra fields may contain a variety of optional data specific to particular operating systems to which the ZIP container is destined. In some cases, the extra fields contain "null" value bytes and are thus reserved for operations that may occur once the ZIP container has been received at the UE 102.

At step 604, the optimizer module 130 determines which (if any) of the identified extra fields are redundant. The extra field may be identified as being redundant based on different characteristics. The central directory is also further analyzed to identify any fields that could be seen to be redundant.

In a first example, the extra field may be identified as being redundant based on a content type of the ZIP container. For example, the inventor has appreciated that Microsoft Word documents as ZIP containers contain entries having a "Growth Hint" field, which field may be recognized as non-essential for transportation and/or storage of the Zip file. Accordingly, the Growth Hint field may be identified as being redundant. As discussed in more detail below with reference to FIG. 9c, the "Growth Hint" field is an optional field included in Microsoft Word documents so as to provide a "padding" and thereby enable a part or entry to "grow" or expand in place at a later point in time, without such growth corrupting the ZIP container. In another example, the ZIP container may be an Android apk file and a "zipalign" field may be identified as being redundant for a particular user agent.

Alternatively or additionally to the first example, one or more of the following methods may be used to identify an extra field as being redundant:

The extra field may be identified as being redundant based on a determination of whether or not any content is contained within the extra field. If it is determined that content is contained within the extra field then the extra field is not redundant. If however there is no content within the extra field (e.g. there may be a padding of "null" value bytes instead of content), then the extra field is identified as being redundant.

The extra field may be identified as being redundant based on a determination of whether or not the extra field is essential for a user agent operation or execution of the ZIP container.

The extra field may be identified as being redundant based on a determination that the field relates to filesystem-specific data. For example, Mozilla Firefox (a type of user agent) uses extensions (software "add-ons" to increase the functionality of the Firefox browser) in the ZIP file format that can be downloaded and installed to a user's Firefox browser. It is typical to include filesystem-specific information such as a language encoding bit, a Group Identifier (GID), a User Identifier (UID), a file modification time and so forth, in entries of the ZIP container. These fields can be removed without affecting the fidelity of the content. Other examples of redundant filesystem-specific information that may be identified and removed from a ZIP container may be as follows:

Removal of a Zip64 overhead if the ZIP container is less than 4 gigabytes in size and/or the number of entries in the ZIP container are less than 64K;

Removal of comments fields; and

Removal of the extra UTF8 filename and comments fields.

At step 606, the optimizer module 130 then removes the identified redundant extra field from the entry of the ZIP container. In the case of removing a Growth Hint field, this may reduce the size of a ZIP container by up to twenty five percent.

FIG. 7 is a schematic state flow diagram showing processes that occur in a second example of an optimization method for use in optimizing a ZIP container (which optimization takes place in step 512 of FIG. 5). This optimization method may be selected from a plurality of optimization methods or, alternatively, this optimization method may always be made when making a decision to optimize the ZIP container. In this example, various optimization techniques for the ZIP container are compared to determine a maximum compression for the ZIP container.

Similar to step 600 of FIG. 6, at step 700, the optimizer module first determines the location of the entries in the ZIP container from the central directory of the ZIP container.

At step 702, the optimizer module 130 parses the local file header of each entry to determine if and what compression type is applied to those entries. This is done by analyzing a "compression method" header within the local file headers of each entry of the ZIP container (see Table 2 for local file header structure). The central directory is also parsed so as to determine the compression type that is applied to the central directory (by analyzing the compression method header of the central directory).

At step 704, the optimizer module 130 then determines, based on the determination at step 700, if the entries of the ZIP container can be further optimized. This is done by modeling several optimization scenarios to predict the size of each entry when using different compression techniques or when no compression is applied. For example, the modeling could work by applying each of the different optimization methods to the ZIP container in turn and determining which of the optimization methods results in the maximum optimization (e.g. highest amount of compression). In particular, the optimizer module 130 will compare the entry in its current form with that entry when no compression is applied (as indicated in by the "uncompressed size" field in the local file header—see Table 2) and when other known compression algorithms have been applied so as to determine the best predicted compression for that entry. For example, the compression algorithms may be Lempel-Ziv (LZ), DEFLATE, Lempel-Ziv-Welch (LZW) or Lempel-Ziv-Renau (LZR). It will be appreciated that this list is non-exhaustive and that many other compression algorithms may be used as will be known in the art. In this example, unlike the example of FIG. 6, no determination of user agent compatibility is required and therefore step 510 of FIG. 5 is omitted. In other examples, a determination is made to see if the user agent is compatible with the compression type and is capable of decompressing the compressed entry.

At step 706, the entry is selectively modified in accordance with the determined best optimization (i.e. as with step 512 of FIG. 5). In some cases, the current form of entry, be it non-compressed or compressed, is determined to be the best compression and therefore no modification of the ZIP container is carried out (in which case the process moves on to step 504 in FIG. 5, whereby no ZIP container optimization is carried out). In some cases, it may be determined that the entry would have a smaller size by removing a current compression and therefore the compression is removed (this may be typical for small files where applying compression is sometimes counterproductive in that it inadvertently bloats (e.g. increase) the size of the file) so that the entry payload is stored in an uncompressed form. In some cases, it may be determined that the entry would have a better compression using a different compression algorithm and so the current algorithm is removed and the better compression algorithm is applied (i.e. the entry is recompressed with the better compression algorithm).

Thereafter, the process moves on to step 514 of FIG. 5, whereby the modified ZIP container is included in a modified HTTP response message for sending to the user agent.

As an example of a re-compression, entries of an Office Open XML file that may be compressed using the DEFLATE algorithm, such as is typical for a Microsoft Word document, may be recompressed using algorithms having a higher level of compression such as Bzip2 and LZMA.

As another example of re-compression, as the DEFLATE compression is not typically used at its highest compression level, the same DEFLATE compression algorithm may be used but with a higher level of compression.

Figure 8A:
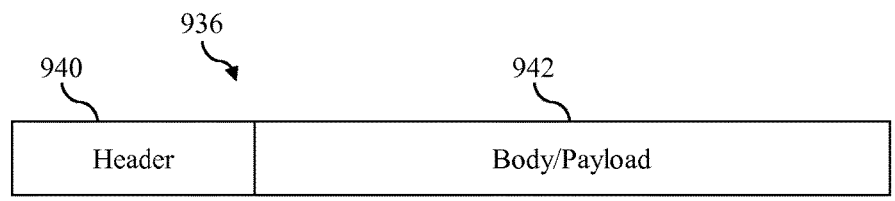
FIG. 8a is a schematic block diagram showing an example HTTP response message.
Figure 8B:
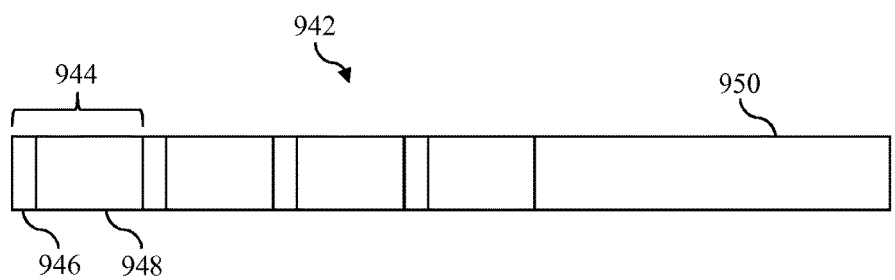

An exemplary embodiment will now be described with respect to an Office Open XML file comprised within a HTTP response message such as the HTTP response message 136 of FIG. 3. In particular, FIG. 8a shows a simplified example of a HTTP response message; FIG. 8b shows a simplified example of a ZIP container of the HTTP response message of FIG. 8a, which in this example is an Office Open XML file; and FIG. 8c shows a simplified example of an entry of the ZIP container of FIG. 8b comprising an extra field in the form of a "Growth Hint" field.

The HTTP response message 936 of FIG. 8a may comprise a header or header data 940 and a body or payload 942. In this example, the HTTP response body 942 is a document compliant with the Office Open XML format, and hence is a type of ZIP container. More particularly, the document is a Word document having a MIME type of "application/vnd.openxmlformats-officedocument.wordprocessingml. document". Accordingly, when the optimizer module 130 receives the HTTP response message 936, it can identify the MIME type from the content-type header of the HTTP response header data 940 and determine that the payload 942 of the HTTP response message 936 is a ZIP container (and more particularly, an Office Open XML file).

FIG. 8b is a schematic block diagram showing the ZIP container 942 of the HTTP response message of FIG. 9a in more detail. Each of the entries 944 or files include a local entry header 946, entry data 948 and an optional data descriptor, which may be created for streaming purposes (not shown). A central directory 950 is provided at the end of the ZIP container 942 and identifies the entries 944 that are in the ZIP container 942 and also identifies where in the ZIP container 942 those entries 944 are located. Therefore, after having identified the received HTTP response message 936 to comprise a ZIP container 942, the optimizer module 130 may then walk the ZIP container 942 and read the central directory 950 so as to identify and locate the entries 944 within the ZIP container 942.

Figure 8C:
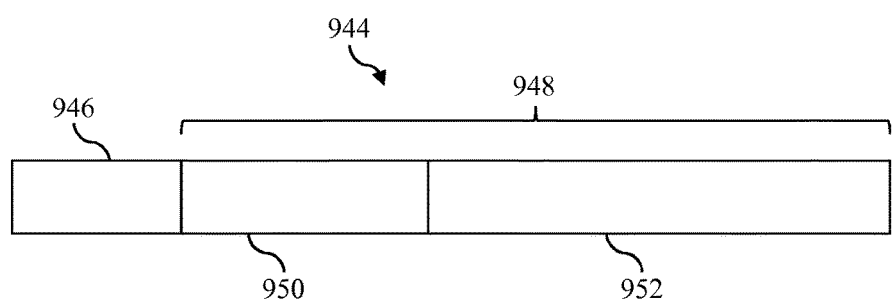
FIG. 8c is a schematic block diagram showing an example entry of the ZIP container of FIG. 8b.

FIG. 8c is a schematic block diagram showing an example entry of the ZIP container of FIG. 8b in more detail. In particular, the ZIP container 942 is an Office Open XML file comprising multiple entries 944 (only one entry shown for simplicity of explanation). As with FIG. 8b, the entry 944 may comprise a local file header 946 and a payload 948 (and optional may include a data descriptor). The local file header 946 is as set out in Table 2.

TABLE 2

Local entry header of ZIP container

| Offset | Bytes | Description |
|---|---|---|
| 0 | 4 | Local file header signature = 0x04034b50 |
| 4 | 2 | Version needed to extract (minimum) |
| 6 | 2 | General purpose bit flag |
| 8 | 2 | Compression method |
| 10 | 2 | File last modification time |
| 12 | 2 | File last modification date |
| 14 | 4 | CRC-32 |
| 18 | 4 | Compressed size |
| 22 | 4 | Uncompressed size |
| 26 | 2 | File name length (n) |
| 28 | 2 | Extra field length (m) |
| 30 | n | File name |
| 30 + n | m | Extra field |

Table 2 shows the fields that may be present in the local header of each entry of the ZIP container. The "Offset" column shows relevant byte offset values from the beginning of the entry at which the relevant field begins. The "Bytes" column shows the length of each relevant field in bytes. The "Description" column briefly describes each of the fields. Of particular note are the "Extra field" at offset 30+n bytes and the "Extra field length (m)" field at offset 28 bytes, which may, in some cases, be identified as a redundant field as discussed with reference to FIG. 6. In particular, the extra field may contain a variety of optional data specific to particular operating systems to which the ZIP container is destined. Also of particular note are the "Compressed size" field at offset 18 bytes and the "Uncompressed size" field at offset 22 bytes, which fields may be used in the "best compression" determination described with reference to FIG. 7.

The local file header is followed by a payload or compressed/uncompressed data.

If the CRC-32 (cyclic redundancy check) and file sizes are not known at the time when the header is written, a data descriptor is appended after the payload. In such a case, the local file header fields are filled with zero values, except for the "General purpose bit flag", which is set to a value of bit 3 (0x08) indicating that the CRC-32 and file sizes are not known. An example of a data descriptor is shown in Table 3.

TABLE 3

Data descriptor of an entry of a ZIP container

| Offset | Bytes | Description |
|---|---|---|
| 0 | 0/4 | Optional data description signature of 0x08074b50 |
| 0/4 | 4 | CRC-32 |
| 4/8 | 4 | Compressed size |
| 8/12 | 4 | Uncompressed size |

As shown in Table 3, the 4 byte CRC-32 field, compressed size field and uncompressed size field may be identified by the data descriptor. The data descriptor may optionally have its own signature of bytes in the hexadecimal form of 0x08074b50 so that it can be readily identified.

Consequently, as the data descriptor is appended after the payload, the CRC-32, compressed file size and uncompressed file size are then known and can be identified within the data descriptor (not shown). Accordingly, in such a case where the compressed file size and uncompressed file size are not known from the local file header, the data descriptor may be used to determine these fields (e.g. in the case for the "best compression" determination described with reference to FIG. 7).

In the example of FIG. 8c, the entry 944 of FIG. 8b may comprise several fields 950, 952 (only two shown for simplicity of explanation): a content field 950 and an extra field 952. The content field 950 in this case is populated with content. The extra field 952, in this example, is an optional field that may comprise a "Growth Hint" field. It will be appreciated by a person skilled in the art that the optional field may also comprise other fields in addition or alternative to the Growth Hint field. The "Growth Hint" field is an optional field included in Microsoft Word documents so as to provide a "padding" and thereby enable a part or entry to "grow" or expand in place at a later point in time, without such growth corrupting the ZIP container (see "ECMA-376-2, Second Edition, 2008, Office Open XML File Formats, Part 2: Open Packaging Conventions" by Ecma, which is hereby incorporated by reference). An example of the structure of the extra field, when used as a Growth Hint, is shown in Table 4.

TABLE 4

Structure of Growth Hint field in entry of ZIP container

| Field | Size | Value |
|---|---|---|
| Header ID | 2 bytes | A220 |
| Length of Extra field | 2 bytes | The signature length (2 bytes) + the padding initial value length (2 bytes) + length of the padding (variable) |
| Signature (for verification) | 2 bytes | A028 |
| Padding Initial Value | 2 bytes | Hexadecimal number value is set by the producer when the item is created |
| <padding> | [Padding Length] | Should be filled with NULL characters |

As shown in Table 4, the "<padding>" field does not actually contain any content for processing by the user agent when received in an HTTP response message 136 but instead is used to effectively reserve bytes for purposes of allowing the entry to expand. The number of reserve bytes is chosen by the producer/implementer of the ZIP container.

As such, this field may be determined as being redundant for the purposes of transporting and/or storing the ZIP container prior to receipt by the UE 102 (as no data is contained in the container at least until it is received at the UE 102 and a "part" is allowed to grow).

In operation, the optimizer module 130 may accordingly parse each local file header of each identified entry of the ZIP container so as to identify any Growth Hint field (as identified by the Header ID and/or the signature). After having identified one or more Growth Hint fields in the entries of the ZIP container, the identified Growth Hint fields can then be stripped from the entries, as described with respect to FIG. 6. The modified entries and hence ZIP container can then be packaged in a modified HTTP response message 138 for sending to the UE 102.

It is a feature of Microsoft Office application programs that they will introduce a Growth Hint field in a file when saving that file even if such a field is not present in the file prior to saving. Accordingly, after the file has been received by the UE 102, the removed Growth Hint field will be re-introduced the first time the file is saved. Advantageously however, by removing the Growth Hint field prior to sending the file to the UE 102, the size of the file is at least temporarily reduced for the purposes of transportation.

In the above embodiments, various optimization methods were described. In other embodiments, other optimization methods may be possible such as follows:

A further filesystem-specific optimization may include a conversion from a ZIP streaming format to a non-streaming format such as by removing the optional data descriptor of the ZIP container;

In the case of Android application (.apk) files, it is known to use a zipalign archive alignment tool that can optimize such .apk files by ensuring all uncompressed data starts with a particular 4-byte alignment relative to the start of the file. The INE 106 can therefore intercept .apk files and analyze them to see if a zipalign optimization has been applied. If no such optimization has been applied, the optimizer module 130 of the INE 106 may then apply the zipalign tool to that .apk file. In more detail, the optimization performs the 4-byte alignment to ensure a more efficient memory-mapping by the operating system that executes the .apk file. This is due to the fact that the Android operating system's resource-handling code operates optimally using 4-byte boundaries and thus, by performing the 4-byte alignment process, an improved memory-map is provided. This in turn reduces RAM (Random Access Memory) consumption due to the ability of the operating system to access the content of the .apk file faster and more efficiently.

In the above embodiments described with reference to FIG. 5, a user agent determination was made by reading a user agent header of the HTTP request message 134-1. In some cases, some fields within the header data, such as the user agent header, will be omitted or will contain erroneous or ambiguous data. For example, a browsing application may be available in different versions, one for a desktop computer and another for a mobile telephone, but may fail to specify which version is sending the message. A further example, often described as spoofing, is where the user agent header field identifies an application other than the one sending the message. This may be done to achieve a certain effect, such as enabling a browser on a mobile device to retrieve a webpage formatted for a desktop browser and vice versa. However, incorrect, incomplete or omitted header data, whether done deliberately or not, can cause problems. Accordingly, in some embodiments, the INE 106 may be able to accurately determine header data values which have been omitted or incorrectly/incompletely provided, as described in co-pending UK patent application GB1219523.6, which is hereby incorporated by reference in its entirety. More specifically, the omitted or incorrectly provided header data may be determined using data from a plurality of messages (e.g. HTTP request messages). Each of the plurality of messages may comprise header data, which header data may comprise a plurality of fields each having a value (i.e. a name-value pair). A first message is received and data indicative of at least some of the header data of the first message is stored. A second message is received and a value for at least one given field associated with header data for the second message is determined, based at least on the stored data and the header data of the second message, wherein the determined value is other than a value of the given field of the second message. In this manner, the INE 106 is able to accurately determine header data values which have been omitted or incorrectly/incompletely provided. Additionally, as taught in GB1219523.6, some information is not available in the header data of messages, irrespective of whether it is omitted or not. This information may include properties or characteristics of the agent sending the message, such as screen size, processing capabilities or the type of device (i.e. make and model). Accordingly, by determining the identity of the agent sending the message, it is possible to determine these other properties by looking up information in a memory. The property information may be stored in, for example, a database. Here the type of agent may refer to a type of device, a type of application running on a device, or a combination of the two. In some examples, such property information or characteristics can be used to determine how an archive container may be optimized.

In the above exemplary embodiments, local entries of the ZIP container were described as being identified by walking the ZIP container, before then reading the central directory of the ZIP container. In other exemplary embodiments, it will be appreciated that the identifying of the local entries may be done by first reading the central directory and then parsing the ZIP container. Alternatively, in some exemplary embodiments, only the central directory is read to identify the local entries, or the ZIP file may be parsed without reading the central directory to identify the local entries.

The above embodiments are to be understood as illustrative examples of the invention. Further embodiments of the invention are envisaged. In the above exemplary embodiments, a determination is made by the optimizer module 130 whether or not the received HTTP response message 136 may comprise a ZIP container. In other exemplary embodiments, this step is not necessary but instead, the optimizer module 130 assumes that all received messages comprise ZIP containers. For example, the determination of whether or not the HTTP response message 136 may comprise a ZIP container may be performed by another module of the INE 106, which then sends the HTTP responses having the ZIP containers to the INE 106. Alternatively, this determination may be performed by another entity that is remote from the INE 106 in the network and sends HTTP responses having ZIP containers to the INE 106 for possible optimization.

In one embodiment, a further optimization method for use in optimizing a ZIP container (which optimization takes place in step 512 of FIG. 5) may comprise determining whether or not the archive file format may be changed from a first type of ZIP container to a second, different type of ZIP container so as to improve the overall compression of the ZIP container. In particular, this may be applied in cases where the ZIP container comprises entries which only have the DEFLATE compression algorithm applied. In these instances, it may be determined that a GZIP container would provide a smaller container size and therefore the ZIP container can be converted to a GZIP container by the optimizer module 130. Advantageously, the change of container may be made without needing to decompress and then recompress any content.

Although exemplary embodiments have been described above with reference to Hypertext Transfer Protocol (HTTP) signaling, it will be appreciated that embodiments of the present invention are not limited to such examples and that the present application may also take place in other communication signaling systems. For example, the invention may be used for optimizing email content.

In another example, the invention may be used for optimization of electronic documents for archiving. In this example, a document is uploaded (e.g. posted) over a network from a user device to a server, and the server optimizes the document before sending it onwards to a storage device for archiving. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. Apparatus for modifying messages having an archive format in a network comprising the apparatus, a second network device and a third network device, the apparatus comprising:
    at least one processor;
    and at least one memory including computer program code;
    the at least one memory and the computer program code being configured to, with the at least one processor, cause the apparatus at least to:
    receive a message sent from the second network device for receipt by the third network device;
    based on a determination that content of the received message that is in an archive format is modifiable so that the received message takes up less space and/or takes up less bandwidth when being transmitted to the third network device, modify the content of the received message that is in an archive format; and
    send the received message with the optimised content to the third network device,
        wherein the received message having the archive format comprises a container for an electronic file, the received message having a header and a body and the container being in the body,
        wherein the container is a ZIP container,
        wherein the modifying the content of the received message comprises:
            identifying a Growth Hint field of the ZIP container for removal from the ZIP container; and
            and removing the identified Growth Hint field from the ZIP container.

2. Apparatus according to claim 1, wherein the optimising of the received messaged is based on a characteristic of the received message.

3. Apparatus according to claim 2, wherein the characteristic is a content type indicated by the received message.

4. Apparatus according to claim 1, wherein the file is an Office Open XML file and the field is a Growth Hint field.

5. Apparatus according to claim 1, wherein the received message is a hypertext transfer protocol (HTTP) response message.

6. Apparatus according to claim 5 wherein the processing system is further arranged to cause the apparatus to analyse a content-type header of the HTTP response message to determine if the HTTP response message comprises an archive format.

7. Apparatus according to claim 1, wherein the optimised message for sending to the third network device also comprises an archive format.

8. Apparatus according to claim 1, wherein the archive format is a ZIP file format.

9. A method for modifying messages having an archive format in a communications network, the communications network comprising a first network device, a second network device and a third network device, the method comprising:
    receiving, at the first network device, a message, the message sent from the second network device for receipt by the third network device;
    based on a determination that content of the received message that is in an archive format is modifiable so that the received message takes up less storage space and/or takes up less bandwidth when being transmitted to the third network device, modifying, at the first network device, the content of the received message that is in an archive format;
    sending the received message with the optimized content to the third network device, wherein the received message having the archive format comprises a container for an electronic file, the received message having a header and a body and the container being in the body,
        wherein the container is a ZIP container,
        wherein the modifying the content of the received messages: comprises:
            identifying a Grow Hint field of the ZIP container for removal from the ZIP container, and removing the identified Growth Hint field from the ZIP container.

10. A non-transitory computer-readable storage medium comprising a set of computer-readable instructions stored thereon, which, when executed by a processing system, cause the processing system to carry out a method for modifying messages having an archive format in a communications network, the communications network comprising a first network device, a second network device and a third network device, the method comprising:
    receiving, at the first network device, a message, the message sent from the second network device for receipt by the third network device;
    based on a determination that content of the received message that is in an archive format is modifiable so that the received message takes up less storage space and/or takes up less bandwidth when being transmitted to the third network device, modifying, at the first network device, content of the received message that is in an archive format;
    sending the received message with the optimized content to the third network device,
        wherein the received message having the archive format comprises a container for an electronic file, the received message having a header and a body and the container being in the body,
        wherein the container is a ZIP container,
        wherein the modifying the content of the received messages comprises:

identifying a Growth Hint field of the ZIP container for removal from the ZIP container; and removing the identified Growth Hint field from the ZIP container.

* * * * *